United States Patent [19] [11] 4,329,238
Mitrofanova et al. [45] May 11, 1982

[54] ANTIFRICTION PASTE AND SOLID ANTIFRICTION COATING PREPARED FROM SAME

[76] Inventors: Alla K. Mitrofanova, Chertanovskaya ulitsa, 53, korpus 1, kv. 160; Militsa N. Zelenskaya, 2 Kvesisskaya ulitsa, 25, kv. 80, both of Moscow, U.S.S.R.

[21] Appl. No.: 62,509

[22] Filed: Jul. 30, 1979

[51] Int. Cl.$^3$ ............................................. C10M 5/02
[52] U.S. Cl. ....................................... 252/12; 252/26; 252/28; 252/30
[58] Field of Search .................. 252/26, 12, 28, 30

[56] References Cited

U.S. PATENT DOCUMENTS

| | | | |
|---|---|---|---|
| 2,581,301 | 1/1952 | Saywell | 252/12 |
| 2,700,623 | 1/1955 | Hall | 252/12 |
| 3,756,982 | 9/1973 | Korshak et al. | 252/12 |
| 3,776,845 | 12/1973 | Watanabe et al. | 252/12 |
| 3,808,130 | 4/1974 | Schiefer et al. | 252/12 |
| 3,838,048 | 9/1974 | Hedge et al. | 252/12 |
| 3,839,208 | 10/1974 | Hermann et al. | 252/12 |
| 3,909,424 | 9/1975 | Clark | 252/12 |
| 3,932,286 | 1/1976 | Pylaev et al. | 252/12 |
| 4,055,503 | 10/1977 | Anselment et al. | 252/12 |
| 4,115,283 | 9/1978 | Needham | 252/12 |

FOREIGN PATENT DOCUMENTS 290036 12/1970 U.S.S.R. ............................... 252/12

OTHER PUBLICATIONS

U.S.S.R. Inventors Certificate No. 228,231, Mar. 15, 1966.

*Primary Examiner*—Andrew Metz
*Attorney, Agent, or Firm*—Lilling & Greenspan

[57] ABSTRACT

An antifriction paste containing epoxy resin, molybdenum disulphide, graphite, aluminum, copper, alumosilicate and polyethylenepolyamine, the components being used in the following proportions (in parts by weight):
 epoxy resin: 40–80
 molybdenum disulphide: 15–30
 graphite: 10–15
 aluminum: 5–10
 copper: 5–10
 alumosilicate: 8–15
 polyethylenepolyamine: 5–10.

The antifriction paste may also contain a solvent for the epoxy resin in an amount from 5 to 30 parts by weight. This paste is suitable for both small-and large-size friction assemblies. On the basis of this paste a solid lubricating coating with high antifriction performance is produced. Thus, a coefficient of sliding friction $f_{fr}$ at a sliding speed V=0.06 m/s at a load P=10 kgf/cm$^2$ is 0.2; linear wear rate $I_h$ under the same conditions is $1.0.10^{-9}$, and service life is as high as 500 km.

10 Claims, No Drawings

ANTIFRICTION PASTE AND SOLID ANTIFRICTION COATING PREPARED FROM SAME

FIELD OF THE ART

The invention relates to mechanical engineering, and more particularly, to antifriction pastes to be used to obtain a solid lubricating coating in friction assemblies.

BACKGROUND OF THE INVENTION

Antifriction pastes on the basis of phenol-formaldehyde, epoxy, butyral and other film-forming substances in which the antifriction properties are determined by a filler, such as molybdenum disulphide, titanium diselenide or a mixture thereof are widely known (cf. L. N. Sentjurikhina, E. M. Oparina, "Solid molybdenum disulphide lubricants" (in Russian), "Khimija" Publishers, Moscow, 1966, pp.24-99). The pastes are cured in furnaces at from 100° to 200° C. The latter makes these antifriction pastes unsuitable for large-size friction assemblies, such as slides of machine tools, which are three and more meters long. The pastes are to be used to obtain a solid lubricating coating in small-size friction assemblies only.

Also known in the art are antifriction pastes for producing a solid lubricating coating in friction assemblies, which are solidified at room temperature. Thus, one of the known antifriction pastes has the following composition (in parts by weight):

- epoxy resin: 80-150
- dibutylphthalate: 15-30
- molybdenum disulphide: 50-100
- polyethylenepolyamine: 15-30
- solvent of epoxy resin consisting of 50 parts by weight of toluene, 15 parts by weight of butyl alcohol, 10 parts by weight of ethanol, 10 parts by weight of butyl- or amylacetate, 8 parts by weight of ethylene glycol and 7 parts by weight of acetone: 80-150 (cf. USSR Inventor's Certificate No. 228,231, Int. Cl. B 22 d 11/00).

The above-described paste has a fluid consistency and is applied to contact surfaces of parts of a friction assembly by brushing or spraying (such as by means of a spray gun). Thickness of the resultant solid lubricating coating is limited to a range from 0.05 to 0.1 mm. This thickness limitation considerably reduces the service life R of solid lubricating coating (that is the service life of friction assemblies).

Antifriction performance (sliding friction coefficient $f_{fr}$, intensity of linear wear $I_h$ and service life R) of the solid lubricating coating on the basis of the above-described paste is inadequate when the paste is used in friction assemblies, such as in machine tool slides, especially in machine tools operating at high accuracy. Thus, with a sliding speed $V=0.06$ m/s and at a load of $P=10$ kgf/cm$^2$, coefficient of sliding friction $f_{fr}$, is 0.5, intensity of linear wear $I_h$ is $1.0 \cdot 10^{-7}$, and service life is 8.5 km.

SUMMARY OF THE INVENTION

It is an object of the invention to provide an antifriction paste which ensures the formation of a solid lubricating coating exhibiting high antifriction performance.

Another object of the invention is to provide an antifriction paste which is suitable for both small- and large-size friction assemblies.

With these and other objects in view, the invention resides in an antifriction paste containing epoxy resin, molybdenum disulphide, polyethylenepolyamine, wherein the paste also contains graphite, aluminum, copper, and alumosilicate, the components being used in the following proportions (in parts by weight):

- epoxy resin: 40-80
- molybdenum disulphide: 15-30
- graphite: 10-15
- aluminum: 5-10
- copper: 5-10
- alumosilicate: 8-15
- polyethylenepolyamine: 5-10.

In case it is required to produce a solid lubricating coating exhibiting maximum possible hardness, the antifriction paste preferably contains a large amount of a filler (molybdenum disulphide, graphite, aluminum, copper and alumosilicate). In such case a solvent for the epoxy resin is preferably added to the antifriction paste in an amount from 5 to 30 parts by weight. The addition of a solvent ensures the preparation of a paste having a desired consistency.

The antifriction paste according to the invention is named EDMA.

The addition of molybdenum disulphide and graphite to the composition of the EDMA paste according to the invention enables a considerable reduction of coefficient of sliding friction $f_{fr}$. Thus, at a sliding speed $V=0.06$ m/s and load $P=10$ kgf/cm$^2$, coefficient of sliding friction is 0.1.

The provision of alumosilicate, copper and aluminum in the antifriction paste according to the invention considerably improves mechanical strength and wear resistance of a solid lubricating coating based on this paste, thereby substantially reducing the intensity of linear wear $I_h$ of the lubricating coating. Thus, the intensity of linear wear at a sliding speed $V=0.06$ m/s and at a load $P=10$ kgf/cm$^2$ is $1.0 \cdot 10^{-9}$.

The paste according to the invention is of a dense consistency and may be applied to contact surfaces of friction assemblies in the form of a layer of any desired thickness, preferably 1-2 mm. The service life R of the solid lubricating coating based on the paste is substantially prolonged. Thus, at a sliding speed $V=0.06$ m/s and at a load $P=10$ kgf/cm$^2$, the service life is from 250 to 500 km (depending on the coating thickness).

The antifriction paste according to the invention is cured at room temperature so that it may be used in both small- and large-size friction assemblies. The parts of friction assemblies may be made of metal, wood or plastic.

DETAILED DESCRIPTION OF THE INVENTION

The antifriction paste according to the invention is prepared by blending epoxy resin with a filler in the above-described porportions. Several minutes before the antifriction paste is applied to contact surfaces of parts of a friction assembly, a cold hardener—polyethylenepolyamine—is added to the prepared mixture under thorough mechanical stirring.

The prepared paste is applied, e.g. with a spatula, to contact surfaces of parts of a friction assembly. The applied paste sets at 18°-22° C. in 1.5-2 hours. A solid lubricating coating produced thereby acquires maximum hardness at the above-mentioned temperature in 36-48 hours after the paste has been applied. The duration of curing of the antifriction paste is shortened to 15–20 hours in case the process is conducted at 35°–40° C.

In case the antifriction paste is prepared with a high content of filler, a solvent for the epoxy resin is preferably added to the paste in the amount mentioned above. A solvent for the epoxy resin may comprise acetone, toluene, ethanol, butyl alcohol or a mixture consisting of 50 parts by weight of toluene, 15 parts by weight of butyl alcohol, 10 parts by weight of ethanol, 10 parts by weight of butyl- or amylacetate, 8 parts by weight of ethylene glycol and 7 parts by weight of acetone.

The above-given coefficient of sliding friction $f_{fr.}$, intensity of linear wear $I_h$ and service life R of a solid lubricating coating on the basis of the paste according to the invention are determined using the following procedure, with the employment of a friction-and-wear machine operating with end-face friction.

In accordance with the test procedure, the antifriction paste is applied to the end face of a cylindrical metal sleeve. After curing the paste at 18°–22° C. and finishing the resultant solid lubricant to a desired dimension, the sample (the sleeve with a coating) is installed coaxially with a similar sleeve without a coating (counterpart). Then the sample is contacted with a counterpart under a predetermined load P, and a rotary motion is imparted to the counterpart. Friction force F in the friction contact zone between the surfaces of the sample and counterpart are recorded by using a strain gauge and a recorder.

The coefficient of sliding friction $f_{fr.}$ is calculated by the formula:

$$f_{fr.} = F/P,$$

wherein
F is the friction force in kgf,
P is the normal load in kgf/cm$^2$.

The intensity of linear wear $I_h$ is determined by the formula:

$$I_h = (h/L) \cdot 10^{-9},$$

wherein
h is the wear (thickness reduction) of solid lubricating coating as measured by a micrometer in $\mu$,
L is the sliding friction path in km after which the wear h occurs.

The sliding friction path L is calculated by the formula:

$$L = V \cdot t,$$

wherein
V is the sliding speed of the counterpart in m/s,
t is the sliding time in seconds.

The service life R of solid lubricating coating is calculated by the following formula:

$$R = \Delta/I_h,$$

wherein $\Delta$ is the initial thickness of solid lubricating coating in mm.

A better understanding of the invention may be had from the following detailed description of specific embodiments thereof. In all examples, coefficient of sliding friction $f_{fr.}$, intensity of linear wear $I_h$ and service life of solid lubricant were determined by using the above-described procedure.

EXAMPLE 1

The following antifriction paste was prepared (in parts by weight):
epoxy resin: 60
molybdenum disulphide: 24
graphite: 12
aluminum: 8
copper: 5
alumosilicate: 10
polyethylenepolyamine: 8
acetone: 15.

Epoxy resin was mixed with acetone.

Fillers—molybdenum disulphide, graphite, aluminum, copper and alumosilicate were added to the resultant mixture under intense mechanical stirring during 5–10 minutes. 8–10 minutes before application of the antifriction paste to the contact surfaces of metal parts of a friction assembly, a cold hardener—polyethylenepolyamine—was added to the prepared mixture under thorough mechanical stirring.

The antifriction paste was applied with a spatula to contact surfaces of parts of a friction assembly to form a layer 2 mm thick. The applied paste set in two hours at 18°–20° C. The resultant solid lubricating coating acquired hardness in 40 hours after the application of the paste to contact surface of parts of a friction assembly. The duration of curing of the antifriction paste was shortened to 15 hours in case the curing process was conducted at 35°–40° C.

The antifriction characteristics of the solid lubricating coating on the basis of the above-described paste when tested in a friction assembly at a sliding speed V=0.06 m/s at a load P=2 kgf/cm$^2$ were as follows:
coefficient of sliding friction $f_{fr.}$: 0.25
intensity of linear wear $I_h$: $1.0 \cdot 10^{-9}$
service life R, km: 525.

EXAMPLE 2

The following antifriction paste was prepared (in parts by weight as described in Example 1):
epoxy resin: 40
molybdenum disulphide: 15
graphite: 10
aluminum: 5
copper: 7
alumosilicate: 8
polyethylenepolyamine: 5
solvent for the epoxy resin consisting of 50 parts by weight of toluene, 15 parts by weight of butyl alcohol, 10 parts by weight of ethanol, 10 parts by weight of butylacetate, 8 parts by weight of ethylene glycol and 7 parts by weight of acetone: 30.

The operations of paste application to contact surfaces of parts of a friction assembly and curing were conducted as described in Example 1.

The antifriction characteristics of solid lubricating coating on the basis of the above-described paste when tested in a friction assembly operating at a sliding speed V=0.06 m/s at a load P=2 kgf/cm$^2$ were as follows:
coefficient of sliding friction $f_{fr.}$: 0.28
intensity of linear wear $I_h$: $2.2 \cdot 10^{-9}$
service life R, km: 300.

EXAMPLE 3

The following antifriction paste (in parts weight) was prepared as described in Example 1:
epoxy resin: 45 molybdenum disulphide: 20
graphite: 10
aluminum: 6
copper: 5
alumosilicate: 9
polyethylenepolyamine: 6
toluene: 5.

All operations of paste application to contact surfaces of parts of a friction assembly and curing were conducted as described in Example 1.

Antifriction characteristics of the solid lubricating coating on the basis of the above-described paste were similar to those given in Example 1.

EXAMPLE 4

The following antifriction paste (in parts by weight) was prepared:
epoxy resin: 80
molybdenum disulphide: 30
graphite: 15
aluminum: 10
copper: 10
alumosilicate: 15
polyethylenepolyamine: 10.

Epoxy resin was mixed with a filler (molybdenum disulphide, graphite, aluminum, copper and alumosilicate) in the above proportions. The operations of preparation of the antifriction paste, its application to contact surfaces of a friction assembly and curing were conducted as described in Example 1.

Antifriction characteristics of a solid lubricating coating on the basis of the above-described paste were similar to those given in Example 2.

Given below are comparative data characterizing the antifriction performance of a solid lubricating coating on the basis of known antifriction pastes. The characteristics were obtained when testing a friction assembly operating under conditions described in Example 1.

The antifriction paste disclosed in USSR Inventor's Certificate No. 228.231, Int.Cl. B 22 d 11/00 has the following antifriction characteristics:
coefficient of sliding friction $f_{fr.}$: 0.7
linear wear rate, $I_h$: $0.9 \cdot 10^{-8}$
service life R, km: 111.

Antifriction characteristics of a solid lubricating coating on the basis of the antifriction paste Möglice (made by Diamant, FRG) are as follows:
coefficient of sliding friction $f_{fr.}$: 0.47
linear wear rate $I_h$: $2.3 \cdot 10^{-8}$
service life R, km: 40.

What is claimed is:

1. A method of forming a solid antifriction lubricant coating comprising: forming an antifriction lubricant paste by contacting at ambient conditions the following components in the following proportions, in parts by weight:
epoxy resin: 40-80
molybdenum disulphide: 15-30
graphite: 10-15
aluminum: 5-10
copper: 5-10
alumosilicate: 8-15
contacting said antifriction lubricant paste with 5-10 parts by weight of polyethylenepolyamine at ambient conditions; applying said paste to the contact surfaces of a friction assembly; allowing said paste to cure at ambient conditions to form said solid antifriction lubricant coating.

2. The method of claim 1, wherein a solvent for the epoxy resin is contacted with the paste.

3. The method of claim 2, wherein said solvent is selected from the group consisting of acetone, toluene, ethanol, butyl alcohol, butyl acetate, amyl acetate, ethylene glycol, and mixtures thereof.

4. The method of claim 3, wherein said solvent comprises a mixture of 50 parts by weight toluene, 15 parts by weight butyl alcohol, 10 parts by weight ethanol, 10 parts by weight butyl- or amyl acetate, 8 parts by weight ethylene glycol, and 7 parts by weight acetone.

5. The method of claim 1, wherein said coating sets at 18° to 22° C. in 1.5 to 2 hours.

6. An antifriction lubricant coating composition formed in accordance with the method of any of claims 1, 2, 3, 4 or 5.

7. An ambient temperature curable composition for forming a solid antifriction lubricant coating consisting essentially of, in parts by weight:
epoxy resin: 40-80
molybdenum disulphide: 15-30
graphite: 10-15
aluminum: 5-10
copper: 5-10
alumosilicate: 8-15
polyethylenepolyamine: 5-10.

8. The composition of claim 7 also containing a solvent for the epoxy resin in an amount from 5 to 30 parts by weight.

9. The composition of claim 8, wherein said solvent is selected from the group consisting of acetone, toluene, ethanol, butyl alcohol, butyl acetate, amyl acetate, ethylene glycol, and mixtures thereof.

10. The composition of claim 8, wherein said solvent comprises a mixture of 50 parts by weight toluene, 15 parts by weight butyl alcohol, 10 parts by weight ethanol, 10 parts by weight butyl- or amyl acetate, 8 parts by weight ethylene glycol, and 7 parts by weight acetone.

* * * * *